United States Patent [19]

Saslawsky

[11] 3,776,678
[45] Dec. 4, 1973

[54] BLOW MOLDING APPARATUS
[75] Inventor: Sheldon Saslawsky, Easton, Conn.
[73] Assignee: Textron Inc., Providence, R.I.
[22] Filed: Sept. 27, 1971
[21] Appl. No.: 184,144

[52] U.S. Cl. ............425/310, 425/342, 425/387 B, 425/DIG. 205, 425/DIG. 212
[51] Int. Cl. .......................................... B29d 23/03
[58] Field of Search.................... 425/326 B, 387 B, 425/324 B, DIG. 58, 451, 342, 243, 249, 296, 297, 310; 249/79

[56] References Cited
UNITED STATES PATENTS
| | | | |
|---|---|---|---|
| 3,339,232 | 9/1967 | Battenfeld et al. | 425/342 |
| 3,048,891 | 8/1962 | Maass | 425/326 |
| R23,564 | 10/1952 | Hobson | 425/326 |
| 2,918,698 | 12/1959 | Hagen et al. | 425/326 |
| 3,304,354 | 2/1967 | Hill et al. | 425/326 |

Primary Examiner—J. Spencer Overholser
Assistant Examiner—Michael O. Sutton
Attorney—Alexander R. Field

[57] ABSTRACT

Blow molding apparatus and method for making a hollow plastic spool include a four section mold operated in a particular sequence to confine a thermoplastic core by two of the mold sections forming an open ended cavity while such core is permitted to expand outside the open ends of the cavity; coring pins carried by the other two mold sections deform the longitudinal axis of the protruding core and the other two mold sections close the cavity to finalize the shape of plastic spool and to pinch off excess plastic which has blown outside the peripheral edges of the mold cavity.

4 Claims, 8 Drawing Figures

BLOW MOLDING APPARATUS

BACKGROUND OF THE INVENTION

1. Field of the Invention

The present invention relates to blow molding process and apparatus for making hollow plastic spools and, in particular, to such process and apparatus for sequentially shaping thermoplastic material into a hollow spool by a multi-section mold.

2. Description of the Prior Art:

U. S. Pat. No. 3,048,891 and U.S. Pat. No. 3,507,942 are representative of conventional methods and machines for blow molding hollow articles from a thermoplastic material. While the prior art is cognizant of multi-section mold apparatus and of sequentially forming a plastic spool, such prior art encloses the thermoplastic material within the mold cavity whereby subsequent operations on the material takes place within the cavity with the resulting disadvantages that the finally shaped spool may be weakened by uneven distribution of the material, that the spool flanges are not strong enough to withstand impact and/or compressive loads, and that there is no provision for removal of excess material from the mold apparatus or from the finally shaped spool.

SUMMARY OF THE INVENTION

The present invention is summarized in that blow molding method and apparatus for making a hollow plastic article includes forming a tubular element from a plastic material, severing and sealing a plastic core from the tubular element with the plastic core being disposed along a predetermined longitudinal axis, confining the plastic core in an open ended mold cavity while permitting the plastic core to protrude out of the open ended mold cavity, deforming part of the protrusion back into the plastic core along the longitudinal axis to form a longitudinal bore in the plastic core, and shaping the remaining part of the protrusion to form flat end walls on the plastic core.

An object of the present invention is to make a hollow plastic article by permitting a portion of the plastic to expand outside a mold cavity and then deforming and shaping the protruding plastic.

This invention has another object in that a hollow plastic spool is manufactured by blowing portions of a tubular plastic outside a mold cavity in one or more directions and then forming such portions into end walls of the spool.

It is a further object of this invention to provide blowing molding apparatus with a multi-section mold cavity having core pins movably carried by end plates which close the mold cavity.

Other objects and advantages of the present invention will become apparent from the following description taken in conjunction with the accompanying drawings.

DESCRIPTION OF THE PREFERRED EMBODIMENT

For the sake of brevity, supporting frames for the mold sections, driving means, such as hydraulic cylinders, piping systems for circulating coolant in the thermoconductive mold sections, and other conventional mold components are not included in the following description since a variety of such equipment may be utilized with the present invention. For a complete illustration and description of such equipment, reference is made to the above U. S. Pat. No. 3,048,891.

Figure 1:
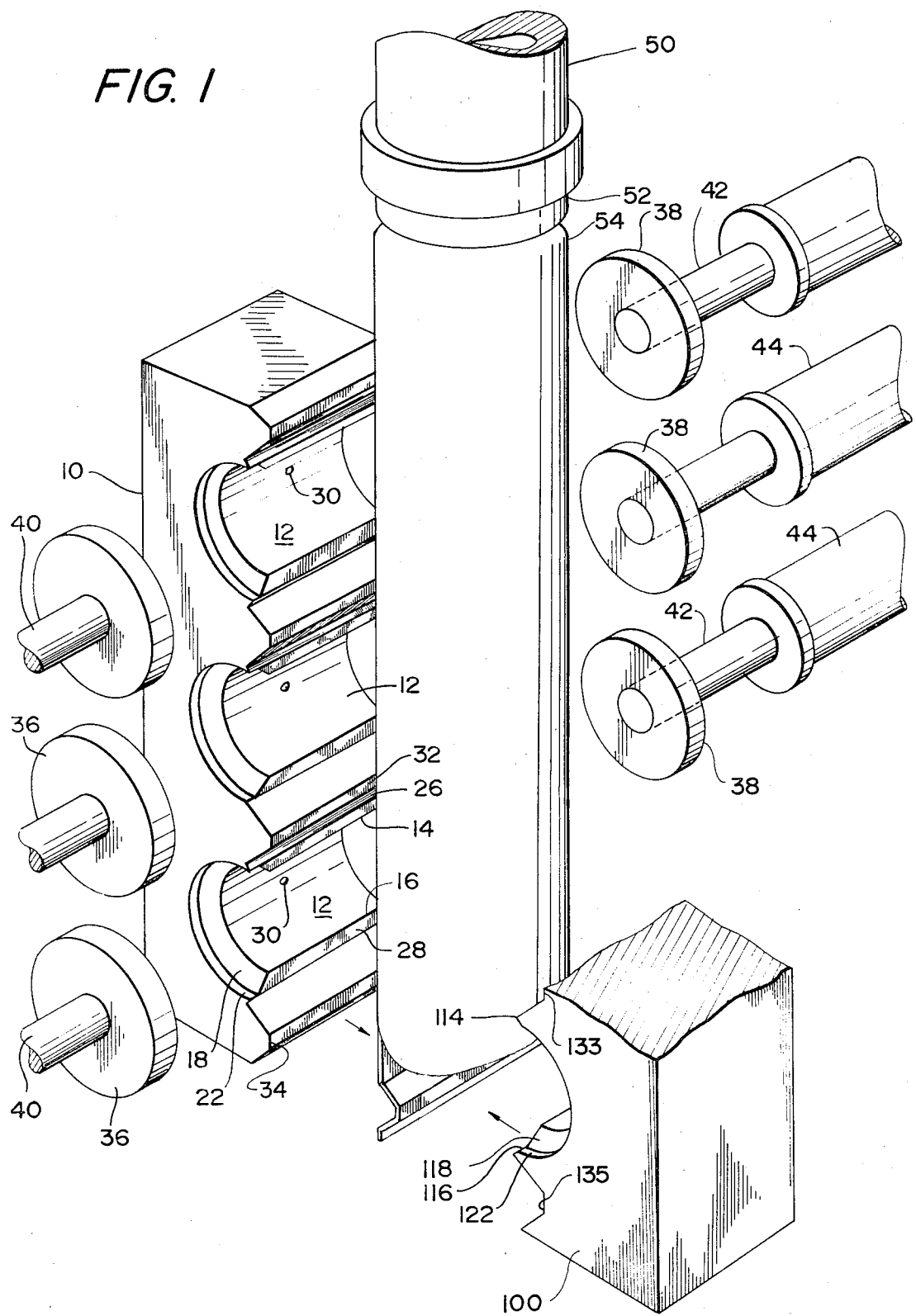
FIG. 1 is an exploded isometric view with parts broken away of blow molding apparatus embodying the present invention.

As is illustrated in FIG. 1, apparatus embodying the present invention includes a pair of mating mold blocks 10 and 100 in opposed relation to each other.

Figure 2:
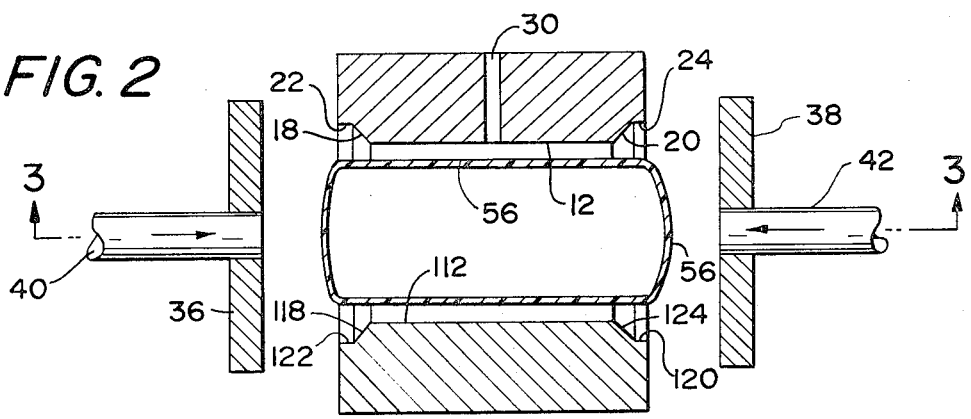
FIG. 2 is an exploded horizontal cross section of a portion of FIG. 1 showing the initial step of operation of the apparatus.

A plurality of spaced semi-cylindrical cavities 12 are formed in the mold block 10; while three cavities 12 are shown, the mold block may include any suitable number and may use only a single cavity. The opposite edges of each cavity define cutting edges 14 and 16; the opposite ends of the cavity 12 are enlarged by means of sloping portions 18 and 20 which terminate in semicircular portions 22 and 24, respectively, (see FIG. 2). Adjacent the cutting edges 14 and 16, the mold block 10 is slightly tapered so as to present sloping surfaces 26 and 28, respectively. An aperture 30 is centrally located in each cavity 12 and extends completely through the mold block 10 as is shown in FIG. 2.

The mold block 100 includes all the elements 12 through 28 described above in connection with the mold block 10; however, such elements are not being separately described but merely identified with similar reference numerals with 100 added. Thus, the corresponding elements for mold block 100 are numbered from 112 through 128. The aperture 30 opening into cavity 12 does not have any corresponding aperture in the mating cavity 112 as will become apparent hereinafter.

Above the sloping surface 26 (as viewed in FIG. 1), the mold block 10 has a projection 32 which in cross section is viewed as a truncated angular configuration; a similar projection 34 is located below the sloping surface 28 and there is always such a projection on each side of the semi-cylindrical cavities 12 when a plurality of such cavities are utilized. A pair of recesses 133 and 135 in the mold block 100 are shaped to conform to the projections 32 and 34, respectively, permitting the mold blocks 10 and 100 to be mated during a molding operation.

Figure 3:
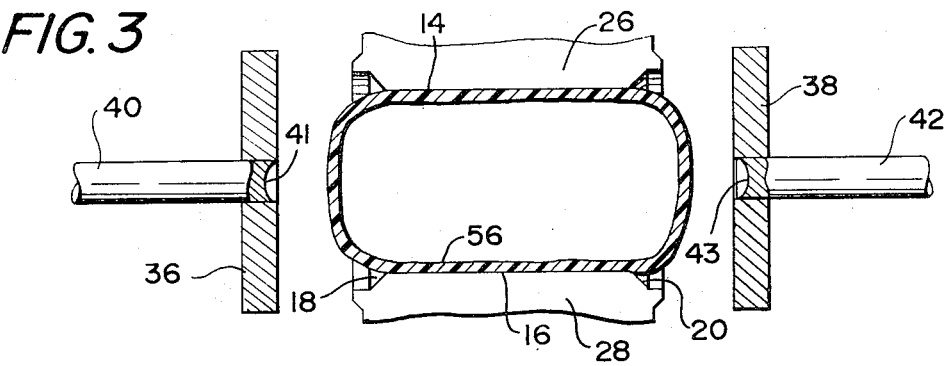
FIG. 3 is a cross section taken along line 3—3 of FIG. 2.

End plates 36 and 38 for each mold cavity are carried on core pins 40 and 42, respectively, in such a manner as to permit unitary movement and relative movement therebetween in accordance with a predetermined sequence of operation. As is illustrated in FIG. 3, opposed faces of the coring pins 40 and 42 are hollowed out in generally concave configurations to define cutting edges 41 and 43, respectively. The coring pins 40 and 42 are movable axially by any suitable means, such as hydraulic actuators 44, one of which moves the coring pin 40 while an opposite one moves the coring pin 42, with both pins 40 and 42 being reciprocated along a common axis defined by the longitudinal axis of the mold cavity.

Figure 8:
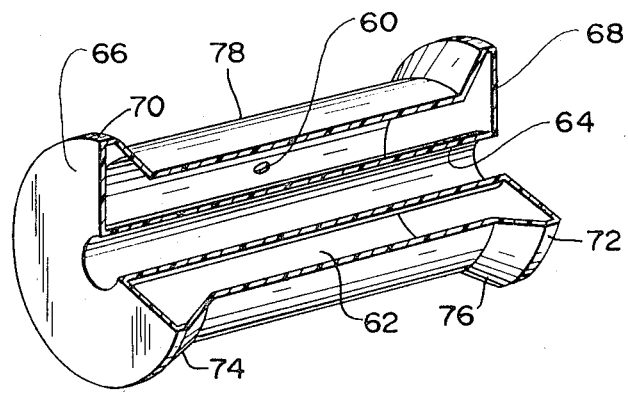
FIG. 8 is an isometric view with parts broken away and parts in section of the molded product removed from FIG. 7.
Figure 7:
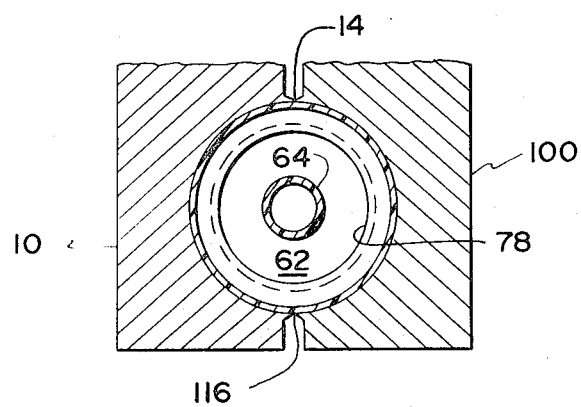
FIG. 7 is a cross section taken along line 7—7 of FIG. 6.

An extruder 50 having a die head 52 delivers an extrudate of plastic 54 in tubular form along an axis transverse to the longitudinal axis of each mold cavity. Any moldable thermoplastic material may be utilized for the tubular plastic 54, such as polyethylene and the like. The diameter of the tubular plastic 54 is controlled by pressurized air introduced through the extruder 50 so that it will be larger than the longitudinal axis of the mold cavity 12-112. Closure of the mold blocks 10 and 100 causes the cutting edges 14-114 and 16-116 to cut the tubular plastic 54 and form a hollow plastic core 56 (see FIG. 2); the end plates 36 and 38 abut the mold blocks 10 and 100 to pinch off adjacent annular plastic flashes 57 from the core 56 while the core pin cutting edges 41 and 43 sever a central portion 58 of the plastic core 56. The product made by the blow molding apparatus is in the form of a hollow spool which is expanded in the mold cavity 12-112 by air from an air injection needle extending through the mold block aperture 30 and leaving a needle like opening 60 in the outer wall of the spool. As is shown in FIG. 8, the plastic spool has a hollow interior 62 with an inner cylindrical wall 64 defining a longitudinal bore extending between flat end walls 66 and 68; the outer wall of the spool is defined by annular flanges 70 and 72 extending from the end walls 66 and 68, respectively, and joining truncated conical walls 74 and 76, respectively, which are connected by an outer cylindrical wall 78.

Figure 4:
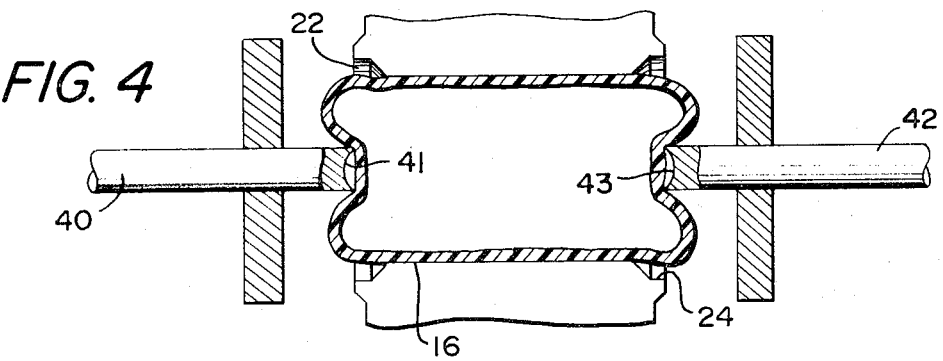
FIG. 4 is a cross section similar to FIG. 3 but showing the second step of operation.

The method of making the plastic spool shown in FIG. 8 will be described in conjunction with the following description of the sequence of operation of the blow molding apparatus. The extrusion die 50 and die head 52 delivers the tubular plastic 54 in between the opened mold blocks 10 and 100; as is shown in FIG. 1, the lower end of the tubular plastic is sealed into a flattened end by the block projections 32 and recesses 133 from a previous molding cycle. As soon as the flattened end clears the lowermost portion of the mold blocks 10 and 100, a new molding cycle commences and the mold blocks 10 and 100 are closed upon each other. The cutting edges 14-114 and 16-116 on the mold blocks sever a plastic core 56 from the tubular plastic 54, which core is confined in the mold cavity 12-112 (FIG. 2). The initial position of the end plates 36 and 38 and the core pins 40 and 42 are shown in FIG. 3 as being slightly spaced from the protruding portion of the plastic core 56 at each end thereof. Each core pin 40 and 42 is now moved by its respective hydraulic actuator 44 in a direction toward each other against the protrusions of the plastic core 56. Such core pins 40 and 42 move relative to their respective end plates 36 and 38 so that each protrusion is deformed and folded back into the plastic core 56 along the longitudinal axis defined by the core pins 40 and 42 (FIG. 4). The relative movement of the core pins and end plates during the initial forming step is limited by any suitable means, such as fixed collars (not shown) on the core pins 40 and 42. Thus, continued movement of the core pins 40 and 42 causes unitary movement of the respective end plates 36 and 38 therewith during the completion of the inward stroke of each core pin.

Figure 5:
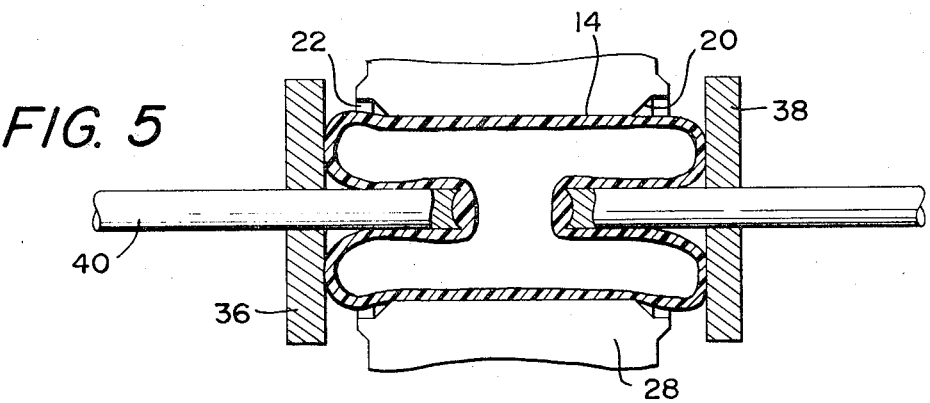
FIG. 5 is a cross section similar to FIG. 4 but showing the third step of operation.
Figure 6:
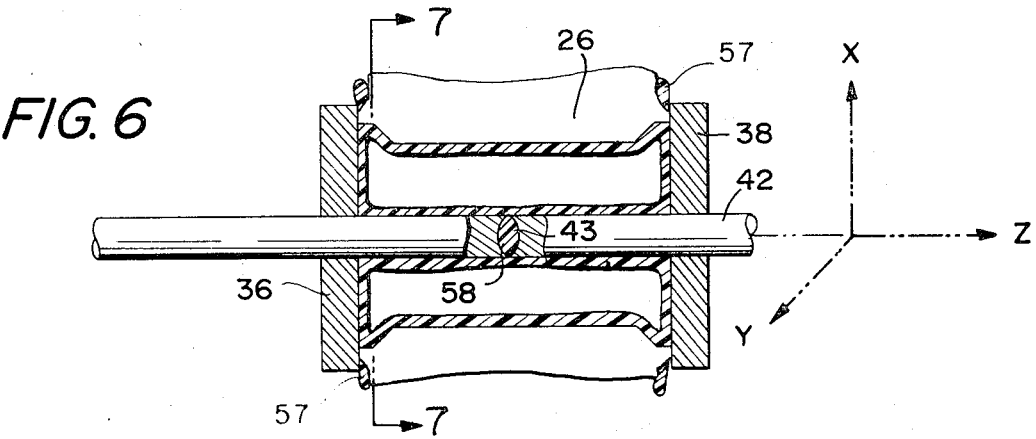
FIG. 6 is a cross section similar to FIG. 5 but showing the fourth step of operation.

During the unitary movement of each core pin and its end plate, the cutting edges 41 and 43 of the core pins move closer to each other to form the longitudinal bore 64 of the spool. FIG. 5 shows the end plates 36 and 38 abutting the protrusion of the plastic core 56, afterwhich the end plates 36 and 38 continue to move until they abut the adjacent end surfaces of the mold blocks 10 and 100. The completion of the inward stroke of the end plates 36 and 38 and their core pins 40 and 42 is illustrated in FIG. 6, at which time an air injection needle (not shown) is inserted through the mold block aperture 30 and the plastic core 56 forming the opening 60 therein; air under pressure is now blown through the needle into the spool interior 62 causing the plastic core to conform to the shape of the mold cavity 12-112 and the end plates 26 and 38. The cutting edges 41 and 43 meet at the completion of the inward stroke of core pins 40 and 42 and sever the excess plastic material 58 therebetween resulting in the smooth bore 64 extending through the plastic spool.

In accordance with the foregoing method and apparatus, the plastic core is confined by the mold cavity 12-112 in the X-Y plane as represented in FIG. 6 but is permitted to blow outside the mold cavity in the Z plane. The plastic which protrudes outside the mold cavity is engaged first by the core pins 40 and 42 and then by the end plates 36 and 38 which permit final shaping of the spool end walls and which also pinch off the excess flash material 57 that has blown completely outside mold cavity. This arrangement has the particular advantage that a finished spool is made within the mold cavity and does not require any special operation or apparatus to remove flashing after the spool is released from the mold.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. Blow molding apparatus comprising:
   a pair of opposed mating mold blocks cooperating with each other to define a mold cavity opened at its opposite ends;
   said mold blocks being movable against each other to house a hollow plastic core disposed in said mold cavity and having protrusions extending out of said ends;
   core pin means comprising a pair of core pins operatively disposed on a common longitudinal axis and means moving said core pins into the opposite ends of said mold cavity into engagement with each other to deform part of the protrusions back into the plastic core and form a longitudinal bore therein;
   each core pin having a cutting edge which engage each other to sever excess material from the plastic core in the longitudinal bore; and
   an end plate carried by each of said core pins for closing the opposite ends of said mold cavity whereby the plastic core may be finally shaped therein.

2. The apparatus as recited in claim 1 wherein each core pin has an initial movement relative to its end plate and a final movement as a unit with its end plate to commence formation of the longitudinal bore before commencing final shaping of the plastic core in the mold cavity.

3. The apparatus as recited in claim 1 wherein said means moving said core pins effects such movement relative to said end plates during an initial forming operation on said plastic core.

4. The apparatus as recited in claim 3 wherein said end plates cooperate with said mold blocks during final shaping of the plastic core to pinch off excess flash material therefrom.

* * * * *